US008840172B2

(12) United States Patent
Haller (10) Patent No.: US 8,840,172 B2
(45) Date of Patent: Sep. 23, 2014

(54) DEVICE AND METHOD FOR SUSPENSION OF A VEHICLE CABIN BY MEANS OF ADDITIONAL VOLUMES

(75) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 12/580,893

(22) Filed: Oct. 16, 2009

(65) Prior Publication Data

US 2010/0237656 A1 Sep. 23, 2010

Related U.S. Application Data

(63) Continuation-in-part of application No. 11/382,688, filed on May 10, 2006, now abandoned.

(30) Foreign Application Priority Data

May 13, 2005 (DE) .......................... 10 2005 023 090

(51) Int. Cl.
*B62D 33/06* (2006.01)

(52) U.S. Cl.
USPC .................................................. 296/190.07

(58) Field of Classification Search
USPC .................. 180/89.13; 188/266.1, 282.4;
267/64.11, 64.15, 64.16, 64.17, 64.28,
267/136, 140.14, 140.15, 217, 218;
280/5.515, 5.517, 5.518, 5.519,
280/124.157; 296/190.07
See application file for complete search history.

(56) References Cited

U.S. PATENT DOCUMENTS

| 3,466,055 | A | | 9/1969 | Keijzer |
| 3,762,769 | A | | 10/1973 | Poschl |
| 3,966,223 | A | | 6/1976 | Carr |
| 4,193,629 | A | | 3/1980 | Merkle |
| 4,283,087 | A | * | 8/1981 | Kauss et al. ............. 296/190.07 |
| 4,418,955 | A | | 12/1983 | Muncke et al. |
| 4,451,079 | A | | 5/1984 | Takahashi |
| 4,463,839 | A | | 8/1984 | Ashiba |
| 4,600,215 | A | | 7/1986 | Kuroki et al. |
| 4,634,142 | A | | 1/1987 | Woods et al. |
| 4,645,042 | A | | 2/1987 | Inoue et al. |
| 4,700,971 | A | | 10/1987 | Doi et al. |
| 4,726,604 | A | | 2/1988 | Asami et al. |

(Continued)

FOREIGN PATENT DOCUMENTS

| CN | 1537747 | 10/2004 |
| DE | 19714576 | 10/1998 |

(Continued)

*Primary Examiner* — Glenn Dayoan
*Assistant Examiner* — Paul Chevenert
(74) *Attorney, Agent, or Firm* — Lowe Graham Jones PLLC (57) ABSTRACT

Devices and methods for suspension of a vehicle cabin using additional volumes of air for utility vehicles. An example device includes at least one air spring for suspension of the utility vehicle cabin, the air spring being arranged between the cabin and a base frame, and a control device for controlling the supply and discharge of at least one additional volume to/from the air spring. At predefinable speed or acceleration values of a movement of the air spring, the additional volume is supplied or discharged by means of the control device in such a way that, in end-of-travel regions of the air spring, the profile of a force/travel air spring characteristic during an extension and/or return spring movement of the air spring does not exhibit any incline or exhibits only a small incline in a first range and in a second range.

14 Claims, 9 Drawing Sheets

(56) References Cited

U.S. PATENT DOCUMENTS

| | | | |
|---|---|---|---|
| 4,729,580 A | 3/1988 | Buma et al. | |
| RE33,626 E | 7/1991 | Asami et al. | |
| 5,217,210 A | 6/1993 | Schützner | |
| 5,255,935 A | 10/1993 | Imani | |
| 5,324,069 A | 6/1994 | Ogawa | |
| 5,425,436 A | 6/1995 | Teramura et al. | |
| 5,428,533 A | 6/1995 | Ogawa | |
| 5,450,322 A | 9/1995 | Tanaka et al. | |
| 5,513,108 A | 4/1996 | Kishimoto et al. | |
| 5,527,060 A * | 6/1996 | Kutsche | 280/5.515 |
| 5,555,501 A | 9/1996 | Furihata et al. | |
| 5,558,398 A | 9/1996 | Santos | |
| 5,603,387 A | 2/1997 | Beard et al. | |
| 5,623,410 A | 4/1997 | Furihata et al. | |
| 5,941,920 A | 8/1999 | Schubert | |
| 6,000,703 A | 12/1999 | Schubert et al. | |
| 6,029,764 A | 2/2000 | Schubert | |
| 6,067,491 A | 5/2000 | Takahashi | |
| 6,314,353 B1 | 11/2001 | Ohsaku et al. | |
| 7,997,600 B2 * | 8/2011 | Haller et al. | 280/124.157 |
| 2001/0044685 A1 | 11/2001 | Schubert | |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2004/0227050 A1 | 11/2004 | Haller | |
| 2006/0255623 A1 | 11/2006 | Haller | |
| 2010/0213345 A1 | 8/2010 | Haller | |

FOREIGN PATENT DOCUMENTS

| | | | |
|---|---|---|---|
| DE | 20214583 | 1/2003 | |
| EP | 0089794 | 9/1983 | |
| EP | 89794 A2 * | 9/1983 | B62D 33/06 |
| EP | 1188608 | 3/2002 | |
| EP | 1188608 A1 * | 3/2002 | B60N 2/52 |
| EP | 1352595 | 10/2003 | |
| EP | 1464866 | 10/2004 | |
| EP | 1464866 A2 * | 10/2004 | F16F 9/04 |
| EP | 1468870 | 10/2004 | |
| JP | 61075008 | 4/1986 | |
| JP | 2133215 | 5/1990 | |
| JP | 02141320 A * | 5/1990 | B60G 17/015 |
| JP | 2197470 | 8/1990 | |
| JP | 3200485 | 9/1991 | |
| JP | 406191444 | 7/1994 | |
| WO | 8703256 | 6/1987 | |
| WO | 8912766 | 12/1989 | |
| WO | WO 8912766 A1 * | 12/1989 | F16F 9/04 |

* cited by examiner

DEVICE AND METHOD FOR SUSPENSION OF A VEHICLE CABIN BY MEANS OF ADDITIONAL VOLUMES

PRIORITY CLAIM

This application is a Continuation-in-Part of U.S. patent application Ser. No. 11/382,688 filed May 10, 2006 which claims priority to German Application Serial No. 10 2005 023 090.2 filed May 13, 2005.

FIELD OF THE INVENTION

The invention relates to a device and a method for suspension of a vehicle cabin by means of additional volumes, in particular a utility vehicle cabin for utility vehicles.

BACKGROUND OF THE INVENTION

Suspension devices for vehicle cabins are known in particular for damping an excursion in the level of the vehicle cabin when travelling over uneven road surfaces, such as potholes. A vehicle seat application includes an active damping system for sprung vehicle seats, in which, in addition to a mechanical flexible connection device, a pneumatic off-load device and a hydraulic actuator are arranged between a seat part and a lower part which is connected to the vehicle. Both the pneumatic off-load device and the hydraulic actuator are controlled by a control device as a function of a seat error signal, which is generated for example by a jerky adjustment of the level of the seat part.

Such hydraulic actuators require a connection to the on-board power supply of the vehicle, in particular a utility vehicle, such as a tractor. Such a connection means that the action of the active damping of the vehicle seat is dependent on the function of the on-board power supply and in particular the parameters thereof, so that the parameters of the damping system have to be matched to the parameters of the on-board power supply and thus the system has to be adapted to the respective utility vehicle. Moreover, such suspension devices are of simple design in so far as the hydraulic actuator, upon receipt of a position error signal in relation to the vehicle seat, which is subjected to the weight of a driver, is supplied with air by means of a compressor and as a result an increased air volume is created for sufficient damping of the vehicle seat. Along the adjustment of their level, such suspension devices do not have any comfort region which extends over a relatively long section of the level adjustment travel and thus represents uniform suspension within this level adjustment range with the same return forces.

Also known are air springs which have a linear force/travel air spring characteristic, the incline which differs as a function of the configuration of the air spring and an applied additional volume. In such air springs, use is usually made of additional volumes which are kept constant and which are associated with the extending and retracting air spring as the actual air volume of the air spring.

Such air volumes which are kept constant mean that, when the air spring is set with a force/travel air spring characteristic having a small incline, it is not possible for the utility vehicle cabin to swing back into a central position of the force/travel air spring characteristic since friction forces within the suspension device as a whole are greater than a return force within the force/travel air spring characteristic.

On the other hand, if the suspension device is designed such that the return force is greater—that is to say a greater incline of the air spring characteristic is set-a relatively hard damping is achieved both in the central travel region and in the end-of-travel regions of the air spring.

Moreover, when using an air spring in an air spring characteristic range with a small incline (the so-called comfort range), which requires the switch-on of a large additional volume, it is probable that the end stops in end-of-travel regions of the air spring will be reached in the event of considerable extension and retraction movements due to considerable unevenness, as a result of which a reduced seating comfort is obtained for the user of the vehicle. In the case of air springs for vehicle cabins, the setting of a comfort range is usually desired on account of better transmission values and the resulting higher level of comfort.

Such a comfort range of the air spring characteristic has to date been set by the manufacturer such that it can be used universally for different roads and ground with different levels of unevenness. Since tractors in particular, which travel both on tarred roads and on dirt tracks or even on fields, have very different requirements in terms of optimizing the suspension device or a suspension system for the tractor vehicle cabin, a universal comfort range that has been set from the start can be only a compromise for effective suspension of the vehicle cabin on different types of ground.

SUMMARY OF THE INVENTION

An object of the present invention is to provide a suspension device for a vehicle cabin which permits increased driving comfort for a user during use of the vehicle cabin in a comfort range, which is represented by a force/travel air spring characteristic with very small incline or no incline at all, and in end-of-travel regions which lie outside the comfort range. In one object of the invention a method for suspension of the vehicle cabin by means of such a suspension device is provided.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
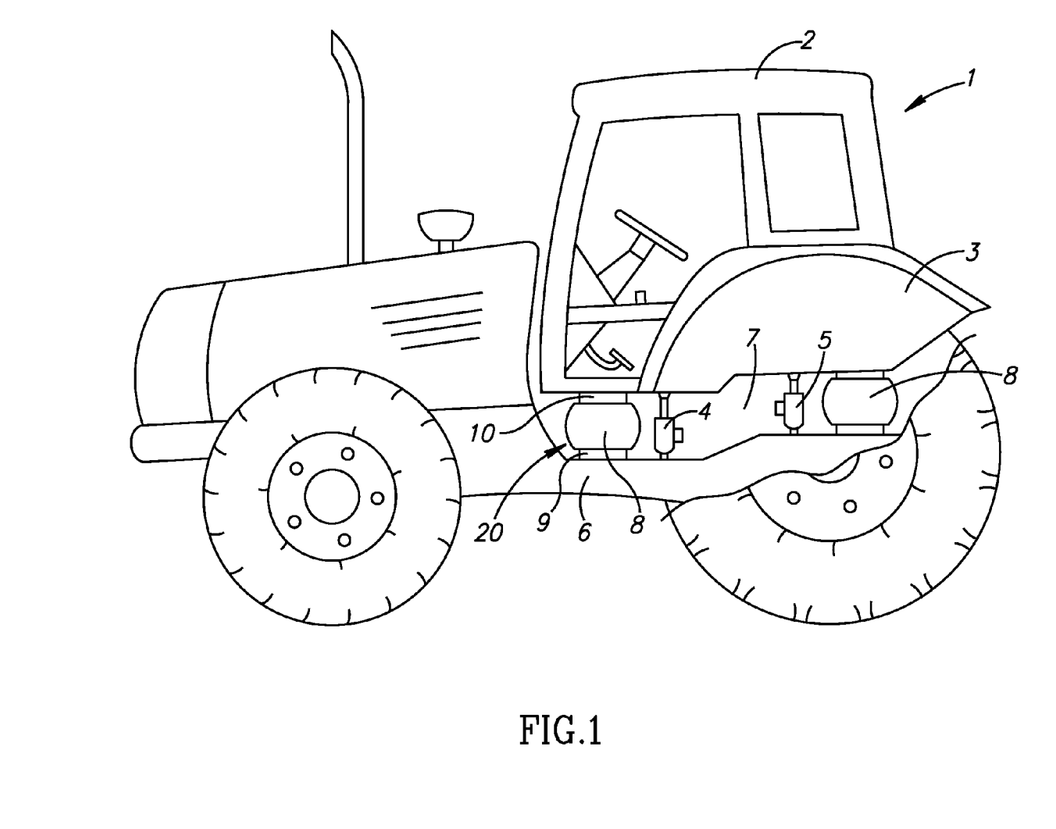
FIG. 1 shows a schematic side view of a utility vehicle having a suspension device formed in accordance with an embodiment of the present invention.

FIG. 1 shows a side view of a tractor 1 having a suspension device 20. The tractor 1 includes a utility vehicle cabin 2 and the mud guards 3. The suspension device 20 includes two damping bearings 4, 5 arranged within an intermediate space 7 between the utility vehicle cabin 2 and a base frame 6 of the tractor 1 and two air springs 8 arranged within the intermediate space 7. Each air spring 8 is connected at its lower end 9 to the base frame 6 and at its upper end 10 to the utility vehicle cabin 2. The air springs 8 can be subjected to pressure and tensile stress.

The suspension device 20 also includes a control device (not shown) that controls the supply and discharge of at least one additional volume to or from the air springs 8, which, at predefined speed or acceleration values of a spring movement of the air springs 8, allows the additional volume which can be supplied or discharged to be switched on or off by means of the control device in such a way that, in end-of-travel regions of the air springs 8, the profile of a force/travel air spring characteristic during an extension and/or return spring movement of the air springs 8 does not exhibit any incline or exhibits only a small incline in a first and in a second range. In this way, depending on the speed with which the air spring extends due to the uneven ground on which the utility vehicle (e.g. the tractor 1) is moving, a type of ground detection is carried out which, by means of the control device functioning as software, calls up a predefinable procedure for the supply and discharge of the additional volume which is provided for the respective type of ground. Particularly when the air spring is moved at medium, high and very high speeds, that is to say when the spring travel of the air springs 8 changes at medium, high and very high speeds, and possibly with measured values being added to the amplitude values of the spring travel, the additional volume is switched on in the end-of-travel regions or is maintained in comparison to the comfort range, in such a way that the air spring does not experience any change in force either during extension or during its return or during both movements.

Figure 2:
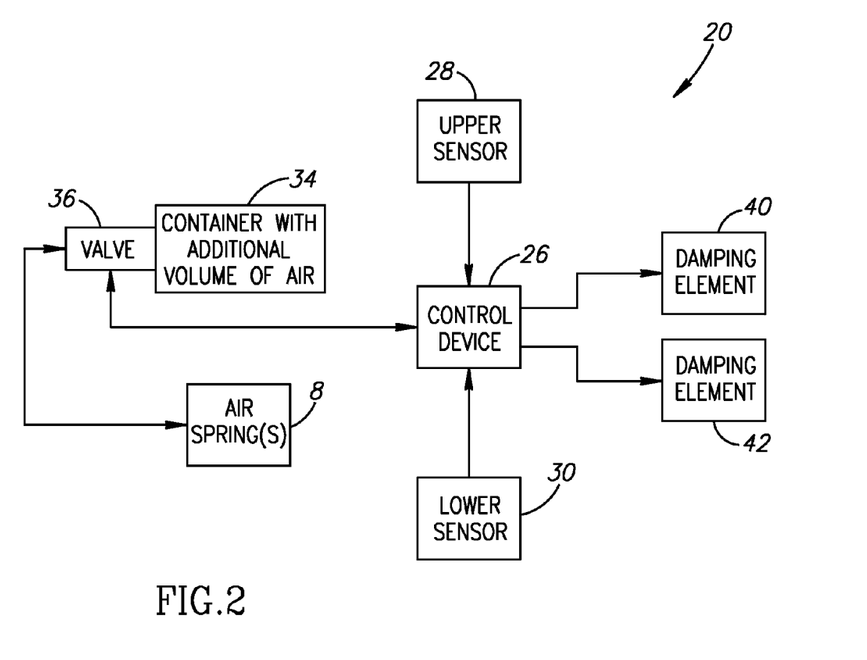
FIGS. 2 and 3 show schematic diagrams of an example suspension device used in the vehicle shown in FIG. 1.
Figure 3:
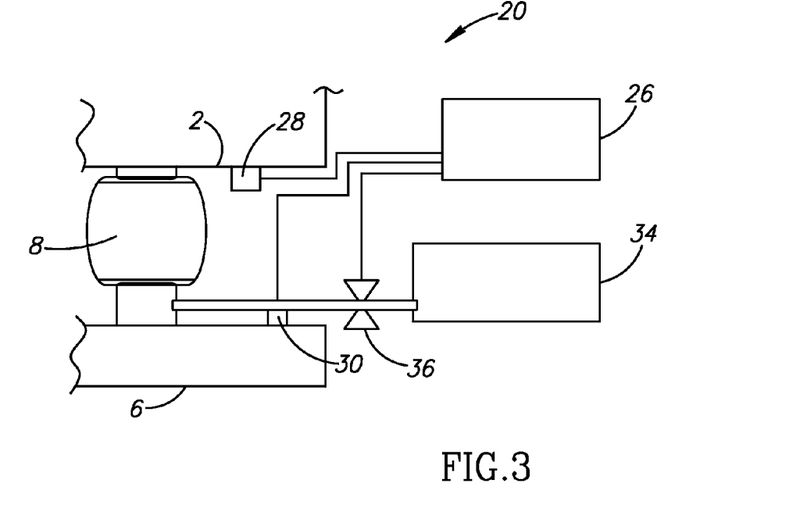

FIGS. 2 and 3 illustrate schematic views of the suspension device 20 used in the tractor 1 of FIG. 1. The suspension device 20 includes a control device 26, a container 34 for holding addition volumes of air, upper and lower sensors 28, 30, an adjustment device (not shown), and damping elements 40, 42. The control device 26 is in signal communication with the valve 36, the upper and lower sensors 28, 30, the adjustment device (not shown) and the damping elements 40, 42. The valve 36 (such as an off-the-shelf valve produced by Schubert & Salzer) is in pneumatic communication with the air springs 8. The damping elements 40, 42 are optional.

The control device 26 receives vertical acceleration and/or vertical speed information from the upper and lower sensors 28, 30, then generates a signal to control the valve 36 based on the received acceleration information to stay in a previously defined comfort range thereby adjusting the cabin 2 to a desired level with sufficient vibration-damping. The valve 36 is a pneumatic directional control valve that supplies or discharges additional volume(s) of air to/from the container 34 in order to have a desirable amount of air in the air springs 8.

The adjustment device (not shown) automatically adjusts the level of the cabin 2 at the start of operational use by a user having a predefined weight. The adjustment device (not shown) supplies air to or discharges air from the air springs 8 in such a way that the air springs 8 adjust to a central position in a third range of the force/travel air spring characteristic. Ranges of force/travel are described in more detail below. The adjustment device (not shown) includes a regulator switch (not shown) which is arranged in the region of an armrest of a vehicle seat in the cabin 2.

Figure 4:
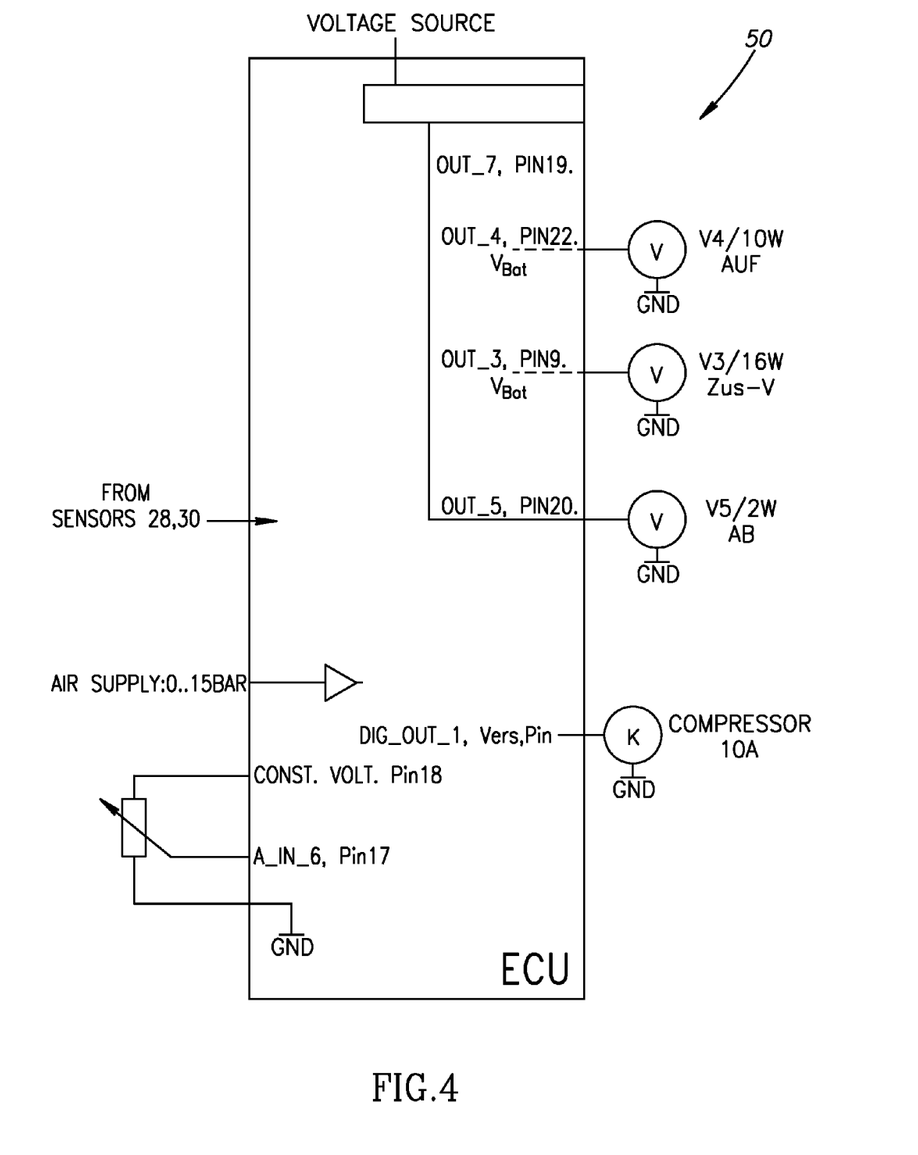
FIG. 4 is a diagram of an example control unit used by the suspension device shown in FIGS. 2 and 3.

FIG. 4 shows an electronic control unit (ECU) 50 that is part of the control device 26. The ECU 50 includes a processor configured to execute software programmed according to schemes described below. An example ECU is produced by Schubert & Salzer.

Precision Quartz Shear ICP® Accelerometers may be used for the sensors 28, 30 of the suspension device 20. It can be appreciated that other comparable accelerometers may be used.

Figure 5:
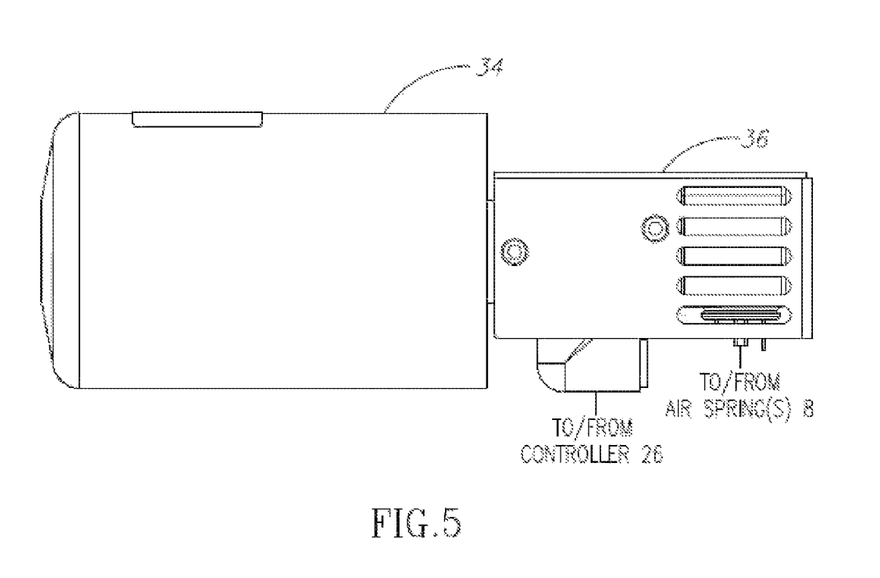
FIG. 5 is a side view of a valve and additional air volume chamber used in the device shown in FIGS. 1-3.

FIG. 5 shows an example of the pneumatic valve 36 that is coupled to an example of the container 34. The pneumatic valve 36 is pneumatically coupled to the container 34 and the airsprings 8 and is in signal communication with the controller 26 (ECU 50). The controller 26 controls operation of the pneumatic valve 36 according to the profiles shown in FIGS. 6-11.

By way of example, at a first, medium speed or acceleration value, the vibration-damping additional volume which can be supplied and discharged in the first and second range during the extension spring movement is in each case smaller than in a third range (the comfort range) which lies between the first and second range, or is fully switched off, so that as a result a rise in pressure is obtained in the end-of-travel regions during the extension of the air spring, which leads to a shortening of the spring travel. During the return spring movement, the additional volume is then partially or fully switched on, so that as a result a horizontally running section is obtained within the force/travel air spring characteristic. This leads to a return of the air spring with an additional volume having a value from a range of for example 0.1-10 liters, and to reduced vibration.

From a second speed or acceleration value, which corresponds to a considerable introduction of force and thus lies above the first value, the additional volume within the first and second range is switched on both during the extension spring movement and during the return spring movement, resulting in a type of neutral position of the suspension system as a whole. There is therefore no rise in pressure in the first and second ranges, which represent the end-of-travel regions and lie outside the comfort range, regardless of whether the air springs 8 are subjected to pressure or tensile stress, that is to say whether the vehicle cabin 2 is moved downwards or upwards. The air springs 8 thus extend and return in this first and second range without any opposing force. Vibration is reduced.

At a third speed or acceleration value, which corresponds to a very considerable introduction of force and lies above the two previous values, the additional volume in the first and second range for the extension movement is in each case greater than in the third range, or is fully switched on, and during the return spring movement is fully switched off or is supplied to a lesser extent than in the third range. There is therefore no rise in pressure in the first and second ranges during the extension movement of the spring, for which reason the air spring extends and returns without any opposing force. At the point of reversal of the movement direction, that is to say during the return spring movement, an increase in energy or a progression takes place as the vehicle cabin 2 moves upwards and a reduction in energy or a depression takes place as the vehicle cabin 2 moves downwards. In both cases, vibration is very considerably reduced as a result. A high level of damping thus takes place.

According to one embodiment, the third range within the force/travel air spring characteristic, as the comfort range of the suspension device 20, is designed to have a variable width depending on further speed or acceleration values, which lie below the first, second and third speed or acceleration values, and optionally depending on predefinable amplitude values of the spring movement. As a result, on account of the measured speed or acceleration values and optionally the detected excursion distances or amplitude values, which make it possible to determine the type of ground on which the vehicle, for example a tractor, is currently travelling, a mode assigned to these values is called up within the control device 26, said mode defining the boundaries of the comfort range. By way of example, when travelling on a tarred road, at low speed values or when predefined excursion distances are measured, a "road" mode is activated. The mode is not providing with any comfort range since a sufficiently precise central cabin position is ensured without any large excursion distances. Other modes are "road transition", at which a transition from the tarred road to a dirt track or vice versa takes place and thus a narrower comfort range is defined, and the "difficult ground/field, etc." mode, in which a wide comfort range is set on account of the introduction of considerable forces, which mean relatively large excursion distances and relatively high speed values.

The level of both the damping bearings 4, 5 and the air springs 8 can be adjusted in such a way that they move downwards when subjected to pressure by the weight of the cabin and the driver when travelling over a pothole and move upwards and/or vibrate for example after travelling over a pothole.

Figure 6:
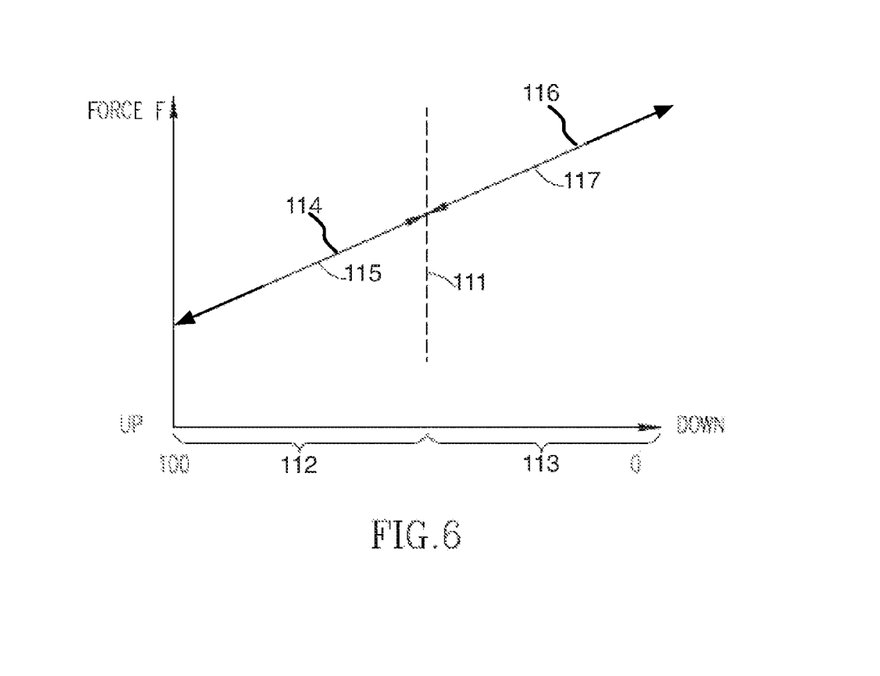
FIG. 6 shows a graph of force/travel air spring characteristics of a suspension device in a "road" mode according to one embodiment of the invention.

FIG. 6 shows a graph of the force/travel air spring characteristic of the suspension device 20 according to the invention in the "road" mode. The abscissa shows a level adjustment travel over 100 mm. A desired central position 111 of the vehicle cabin 2 in respect of its height is shown in the centre of the measurement range of 100 mm, and essentially at a measurement range of 54 mm.

The upward movement of the air spring and thus of the cabin 2 is shown in a first range 112 of the air spring characteristic and the downward movement of the air spring and thus of the cabin 2 is shown in a second region 113. The arrows 114, 116 represent an extension spring movement and the arrows 115, 117 represent a return spring movement.

At a measured spring excursion speed value of less than 0.114 m/s (based on a comparison of the speed/acceleration values produced by the sensors 28, 30), the control device 26 automatically switches into the "road" mode, in which an air spring characteristic with the usual incline and without a comfort range is achieved both during the extension spring movement and during the return spring movement. A comfort range is not required here due to the stable central position of the seat, which is possible on account of the low level of unevenness of a tarred road.

When the cabin and thus the air spring(s) 8 move upwards, a force reduction is obtained, as shown by the arrow 114. During the return movement, the force increases so as to allow a return to the central position, as shown by the arrow 115.

When the cabin 2 and the air spring(s) 8 move downwards, there is an increase in force as shown by the arrow 116, which disappears again due to a reduction in force during the return spring movement as shown by the arrow 117.

Figure 7:
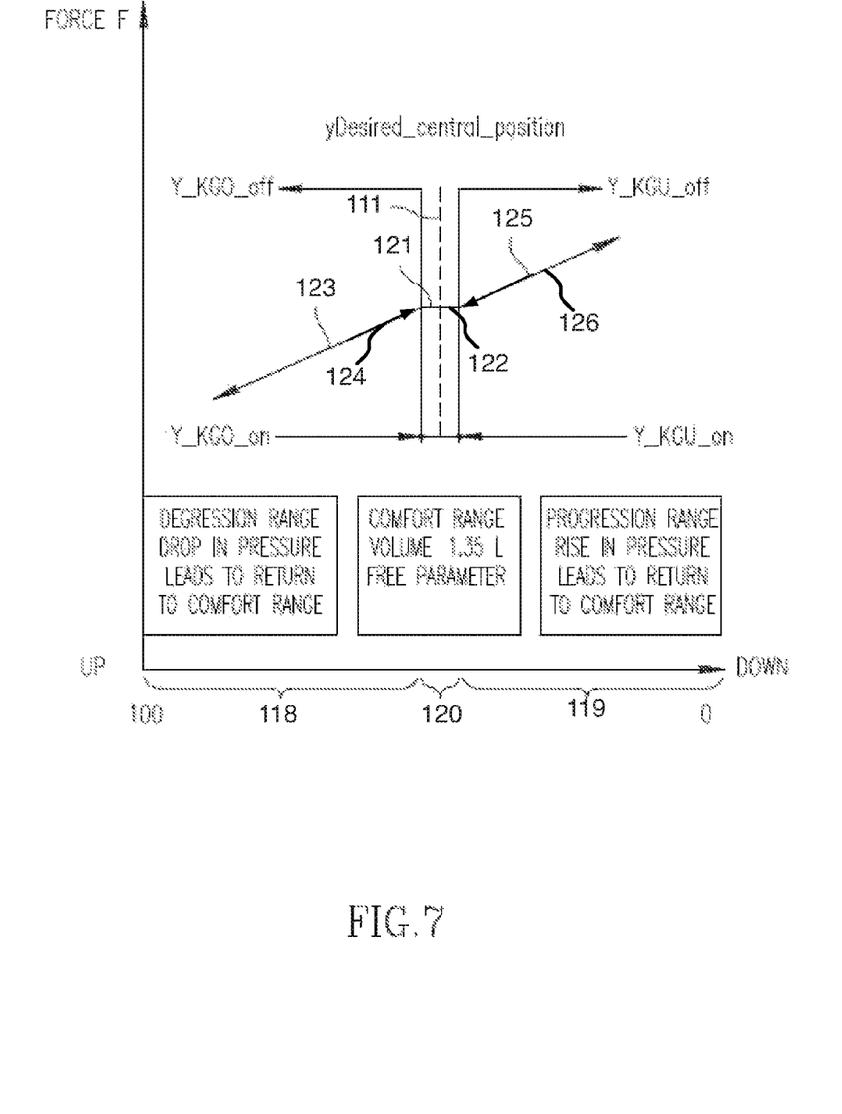
FIG. 7 shows a graph of the force/travel air spring characteristic of the suspension device in the "road transition" mode.

FIG. 7 shows a graph of the force/travel air spring characteristic of the suspension device 20 for the "road transition" mode. In this case, there is a transition of the utility vehicle from the tarred road to an uneven road, such as a dirt track, or vice versa.

In a first range 118 and a second range 119, the air spring movements and the return thereof are shown by the arrows 123, 124 and 125, 126. In addition, a third range 120 including the characteristic sections 121, 122 is arranged as a narrow comfort range in the region of the central position 111, which is obtained by supplying an additional volume of air for example adding 1.35 liters of air.

In the first range 118, which represents a degression range, there is a drop in pressure during the movement 123 leads to a return 124 to the comfort range 120. In the second range 119 which represents a progression range, a rise in pressure during the movement 125 leads to a return 126 to the comfort range 120.

Figure 8:
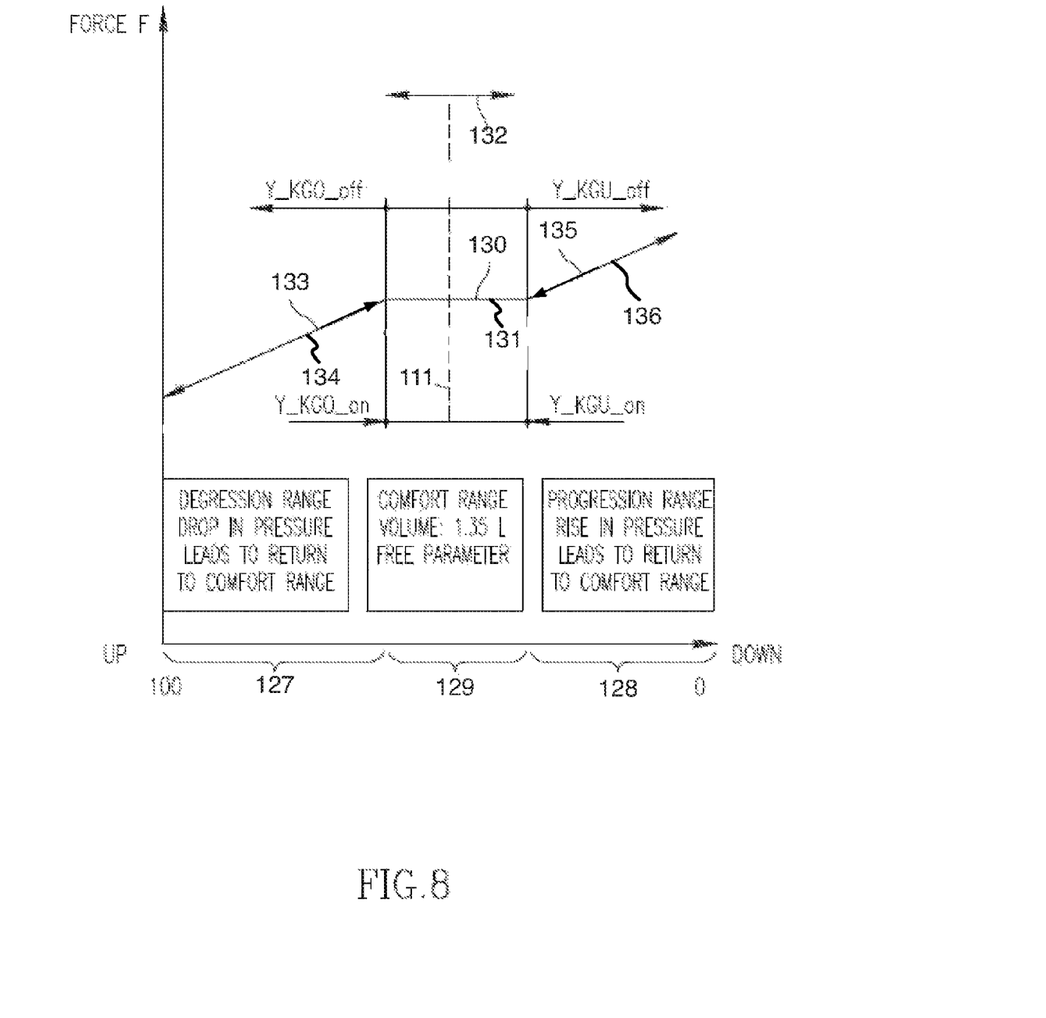
FIG. 8 shows a graph of the force/travel air spring characteristic of the suspension device in the "difficult ground/field, etc." mode.

FIG. 8 shows a graph of the force/travel air spring characteristic of a suspension device in the "difficult ground/field, etc." mode. Once again, the excursion and return spring movements 133, 134 and 135, 136 shown in a first and a second range 127, 128 run along the customary incline in the air spring characteristic.

In a third range 129, a wide comfort range comprising the characteristic sections 130, 131 is shown, said comfort range being designed to be relatively wide on account of the uneven ground being traveled over, so as to achieve maximum comfort. This mode is activated at spring excursion speeds of more than 0.114 and less than 0.228 m/s. Reference 132 schematically shows the section of the level adjustment travel in which the vehicle cabin can rise and fall with a high level of comfort within the comfort range 29.

In the first range 127, which represents a degression range, a drop in pressure 133 leads to a return 134 to the comfort range 129, whereas, in the second range 128, which represents a progression range, a rise in pressure 135 leads to a return 136 to the comfort range 129.

Automatic detection of or distinction between the road conditions according to the modes as illustrated in FIGS. 6 to 8 can be effected as follows:

At the start, a weight adjustment takes place when the vehicle cabin 2 is newly occupied by a new driver and possibly additional objects. This takes place automatically, wherein the suspension device 20 is set to an optimized central position level determined beforehand during a previous use of the vehicle. If the vehicle cabin 2 is briefly left, for example for a period of less than 8 seconds, no break in occupancy of the cabin is detected. No readjustment thus takes place. Longer breaks, as required for example when connecting a trailer, do not lead to readjustment provided that the weight of the vehicle driver and of the objects occupying the cabin does not change when the cabin is reoccupied.

In addition, initial level adjustment of the vehicle cabin is possible when there are no large spring excursion movements.

Once the weight has been set and the level has been adjusted, the suspension device 20 is automatically set to the "road transition" mode at the start of travel. Depending on the condition of the road and the forces introduced as a result into the suspension device 20 and/or the spring excursions (acceleration values), the "road" or "difficult ground/field, etc." mode is selected by the control device 26 following the evaluation of spring excursion speed or acceleration values. If no values relating to the "difficult ground/field, etc." mode exist, the "road" mode is selected by way of priority.

When changing from the "difficult ground/field, etc" mode to the "road" mode, this takes place via the "road transition" mode within a period of approx. 10 seconds. Upon leaving the tarred road, adjustment parameters of the suspension device 20 are immediately set to the "difficult ground/field, etc." mode on account of the detected values for the spring excursion and the speeds of the spring excursion.

Figure 9:
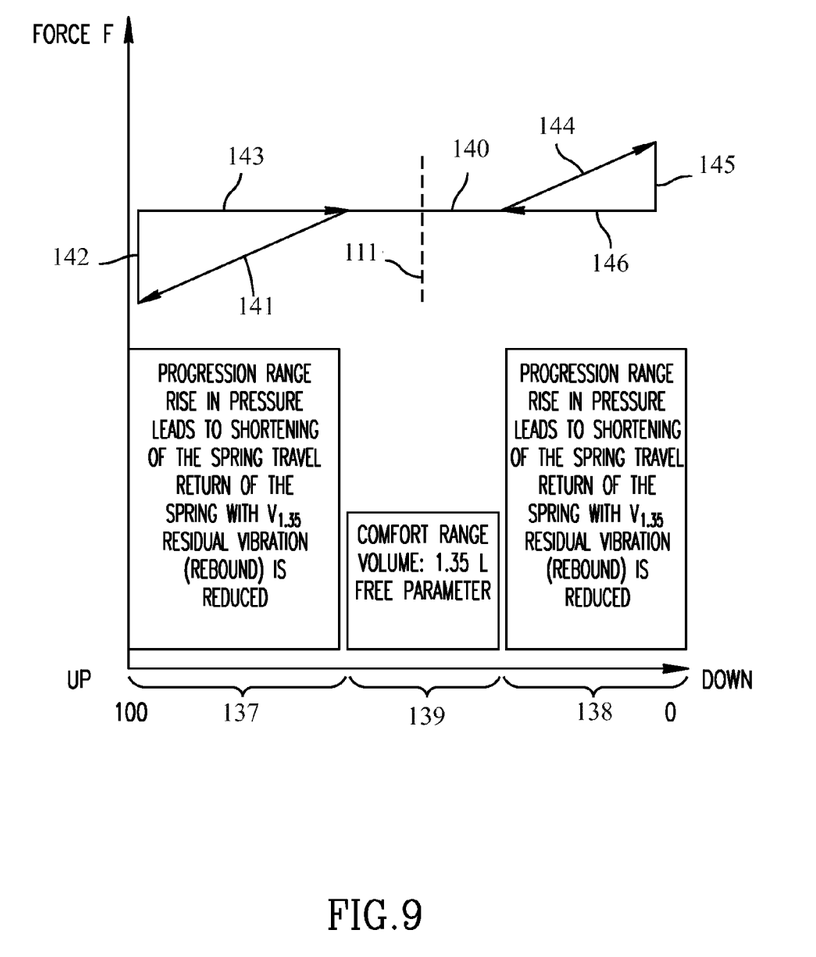
FIG. 9 shows a graph of the force/travel air spring characteristic of the suspension device at medium spring excursion speeds.

FIG. 9 shows a graph of the force/travel air spring characteristic of the suspension device at medium spring excursion speeds. The width of a third range 139, which represents the comfort range, corresponds to the width of the comfort range shown in FIG. 8. This can also be seen on the basis of a characteristic section 140.

In a first range 137, in the event of an upward spring movement as shown by reference 141, the additional volume is firstly switched off, as a result of which a rise in pressure is obtained in the degression range shown here, which leads to a shortening of the spring travel. During a return spring movement during the transition from the arrow 141 to arrow 142 then arrow 143, the container 34 containing the additional volume of air is then switched on, which, after the previous braking during the spring excursion movement 141, gives rise to an increase in force as shown by reference 142, up to the level of the horizontally running characteristic section 140. The air spring(s) 8 is then returned to the comfort range by means of the additional volume without any incline in the characteristic (cf. reference 143).

In a second range 138, during a downward spring movement, braking is effected by initially switching off the container 34 containing the additional volume of air (reference 144). The container 34 containing the additional volume of air is then switched on at the transition to the return spring movement 145, 146, wherein an initial reduction in force is achieved down to the level of the horizontally running characteristic section 140 and then the return characteristic continues without any incline, as shown by reference 146. Vibration is reduced in both cases.

Figure 10:
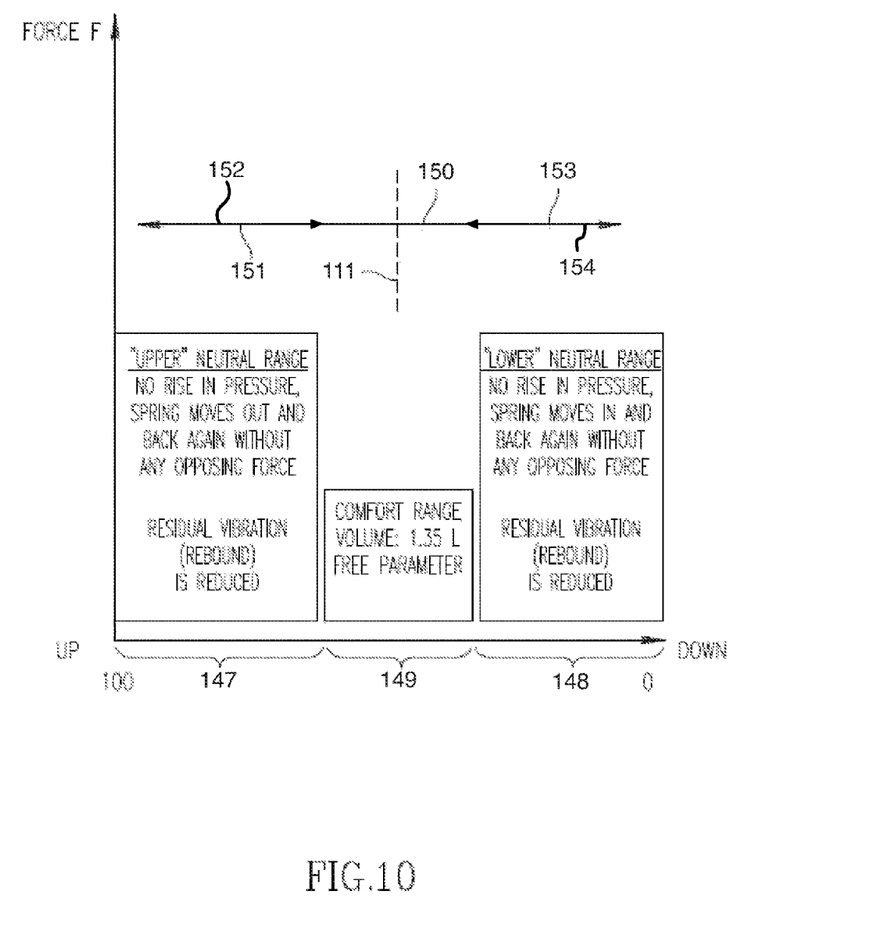
FIG. 10 shows a graph of the force/travel air spring characteristic of the suspension device at high spring excursion speeds.

FIG. 10 shows a graph of the force/travel air spring characteristic of the suspension device at a high spring excursion speed of for example more than 0.3185 m/s and less than 0.353 m/s. In the event of an upward or downward spring movement in this speed range, in a first and second range 147, 148 of the air spring characteristic the additional volume is already switched on at the start of the spring movement, that is to say when passing beyond the boundaries of a comfort range 149. As a result, a characteristic 151, 152 and 153, 154 which runs horizontally and without any incline in continuation of a characteristic section 150 is obtained during the extension and return spring movement.

In such a first and second range which is neutral with respect to the characteristic profile, no rise in pressure takes place during the spring movement and the suspension moves out or in and back again without any opposing force. Vibration is further reduced.

Figure 11:
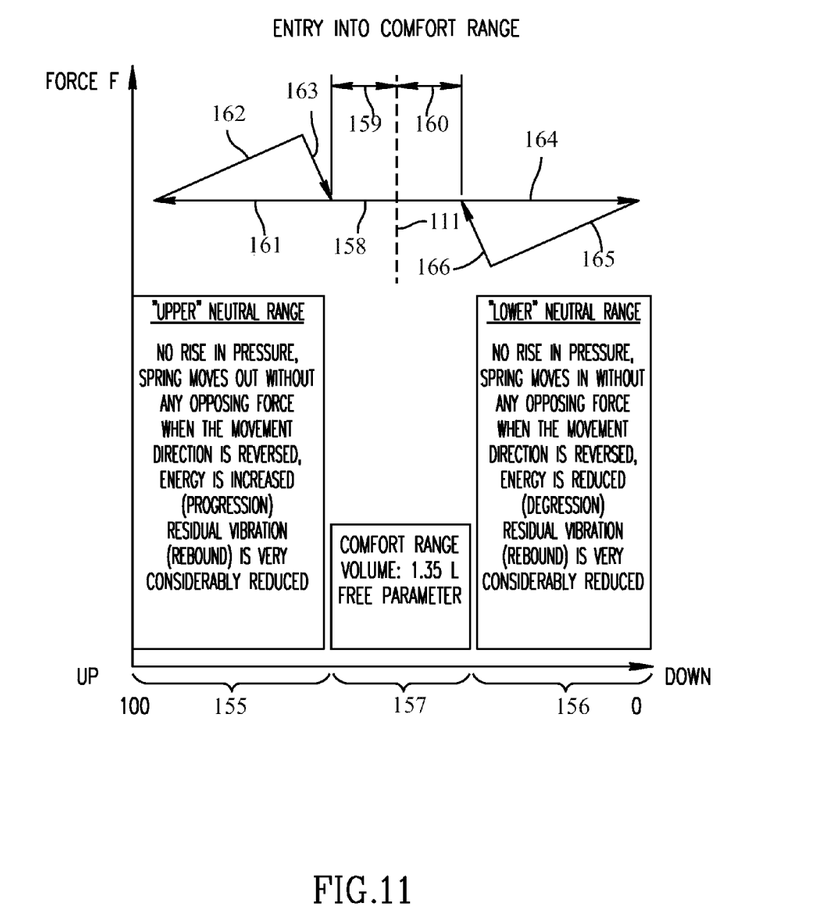
FIG. 11 shows a graph of the force/travel air spring characteristic of the suspension device at very high spring excursion speeds.

FIG. 11 shows a graph of the force/travel air spring characteristic of the suspension device at a spring excursion speed of more than 0.353 m/s. As in the diagram shown in FIG. 10, in a first range 155 and in a second range 156 the additional volume is once again already switched on at a transition out of the third range or the comfort range 157. As a result, a continuation of the characteristic 158, which already runs horizontally in the part 159 and 160 of comfort range 157, is once again obtained, as shown by characteristic sections 161, 164.

At the point of reversal from the extension spring movement to the return spring movement, that is to say in the region of the tips of the two arrows 161, 164, the additional volume is switched off, resulting in an increase in force or a reduction in force while at the same time covering a section as shown by references 162, 165. A considerable reduction in force or a considerable increase in force then takes place as shown by references 163, 166. Accordingly, no rise in pressure takes place during the spring movement, as a result of which the air spring moves out in the first range 155 and moves in in the second range without any opposing force. From the point of reversal of the movement direction of the air spring, an increase in energy (progression) takes place in the first range and a reduction in energy (degression) takes place in the second range. Vibration is very considerably reduced in both cases, resulting in a high level of damping.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for suspension of a vehicle cabin of a utility vehicle having at least one adjustable air spring being capable of accepting and expelling at least one additional volume of air and arranged between the utility vehicle cabin and a base frame of the vehicle, the at least one air spring controllable by a control device, the method comprising:

at a sensor measuring one of vertical acceleration or vertical speed of the vehicle cabin;

at a control device, automatically determining at the control device mode of spring operation based on the measured acceleration or speed of the vehicle cabin; and         automatically controlling transfer of air to and from the at least one air spring based on the determined mode of spring operation; and         wherein a first mode of spring operation is configured to provide for smooth road operation, if the measured acceleration or speed of the vehicle cabin is within a first range;

wherein a second mode of spring operation is configured to provide for rough road operation, if the measured acceleration or speed of the vehicle cabin is within a second range that is higher than the first range;

wherein the first mode does not include a comfort zone and the second mode has a comfort zone having a non-zero range of motion, the air spring being connected to the air container in the comfort zone.

2. The method of claim 1, wherein a third mode of spring operation is configured to provide for transitional road operation, if one of the measured acceleration or speed of the vehicle cabin is within a third range.

3. The method of claim 1, wherein a third mode of spring operation is configured to provide for transitional road operation, within a threshold period of time after movement of the vehicle increases to a value greater than a threshold amount.

4. The method of claim 1, wherein controlling further comprises adding the at least one additional volume of air to the at least one air spring if the measured acceleration or speed is at a second predefined value during an extension movement and a return movement of the at least one air spring in a first and a second travel regions.

5. The method of claim 1, wherein controlling further comprises adding the at least one additional volume of air to the at least one air spring if the measured acceleration or speed is at a third predefined speed or acceleration value during an extension movement and removing the at least one additional volume of air from the at least one air spring during a return movement of the at least one air spring in a first travel region and a second travel regions.

6. The method of claim 1, further comprising the control device determining the spring mode of operation to be a third mode of operation if the measured acceleration or speed is within a third range that is higher than the first and second ranges, wherein the third mode of spring operation is configured to leave the container connected to the air spring throughout an entire extension and a corresponding return movement in a first travel region and an entire compression and a corresponding return movement in a second travel region.

7. The method of claim 6, further comprising the control device determining the spring mode of operation to be a third mode of operation if the measured acceleration or speed is within a fourth range that is higher than the first, second, and third ranges, wherein the third mode of spring operation is configured to leave the container connected to the air spring through the extension movement in the first travel region and the compression in the second travel region and to disconnect the container from the air spring during the corresponding return movement in the first travel region and the return movement in the second travel region.

8. A utility vehicle having a cabin and a base frame, the vehicle comprising:
   a cabin;
   a base frame;
   and a suspension device comprising:
      one or more sensors configured to measure one of vertical acceleration and/or vertical speed of the vehicle cabin;
      at least one air spring;
      a container configured to hold a volume of air;
      a valve configured to transfer air between the container and the at least one air spring; and
      a control device in signal communication with the sensors and the valve, the control device configured to automatically determine mode of spring operation based on the measured acceleration or speed and automatically control operation of the valve transfer of air to and from the at least one air spring based on the determined mode of spring operation, wherein if the measured acceleration or speed is within a first predefined range, the valve removes a volume of air from at least one air spring when an extension movement of the at least one air spring occurs in a first or a second travel region and adds the additional volume of air to the at least one air spring when a return movement of the at least one air spring occurs in the first or second travel region, wherein the first and second travel regions include end-of-travel regions of the at least one air spring;
   wherein a first mode of spring operation is configured to provide for smooth road operation, if the measured acceleration or speed of the vehicle cabin is within a first range;
   wherein a second mode of spring operation is configured to provide for rough road operation, if the measured acceleration or speed of the vehicle cabin is within a second range that is larger than the first range;
   wherein the first mode does not include a comfort zone and the second mode has a comfort zone having a non-zero range of motion, the air spring being connected to a container defining an additional volume in the comfort zone.

9. The vehicle of claim 8, wherein a third mode of spring operation is configured to provide for transitional road operation, if one of the measured acceleration or speed of the vehicle cabin is within a third range.

10. The vehicle of claim 8, wherein a third mode of spring operation is configured to provide for transitional road operation, within a threshold period of time after movement of the vehicle increases to a value greater than a threshold amount.

11. The vehicle of claim 8, wherein the suspension device adds the at least one additional volume of air to the at least one air spring if the measured acceleration or speed is at a second predefined value during the extension movement and the return movement of the at least one air spring in the first and second travel regions.

12. The vehicle of claim 8, wherein the suspension device adds the at least one additional volume of air to the at least one air spring if the measured acceleration or speed is at a third predefined speed or acceleration value during an extension movement and removes the at least one additional volume of air from the at least one air spring during a return movement of the at least one air spring in the first and second travel regions.

13. The vehicle of claim 8, wherein the control device is configured to determine the spring mode of operation to be a third mode of operation if the measured acceleration or speed is within a third range that is higher than the first and second ranges, wherein the third mode of spring operation is configured to leave the container connected to the air spring throughout an entire extension and a corresponding return movement in a first travel region and an entire compression and a corresponding return movement in a second travel region.

14. The vehicle of claim 13, wherein the control device is further configured to determine the spring mode of operation to be a third mode of operation if the measured acceleration or speed is within a fourth range that is higher than the first, second, and third ranges, wherein the third mode of spring operation is configured to leave the container to the air spring through the extension movement in the first travel region and the compression in the second travel region and to disconnect the container from the air spring during the corresponding return movement in the first travel region and the corresponding return movement in the second travel region.

* * * * *